Figures 1, 2, 3:
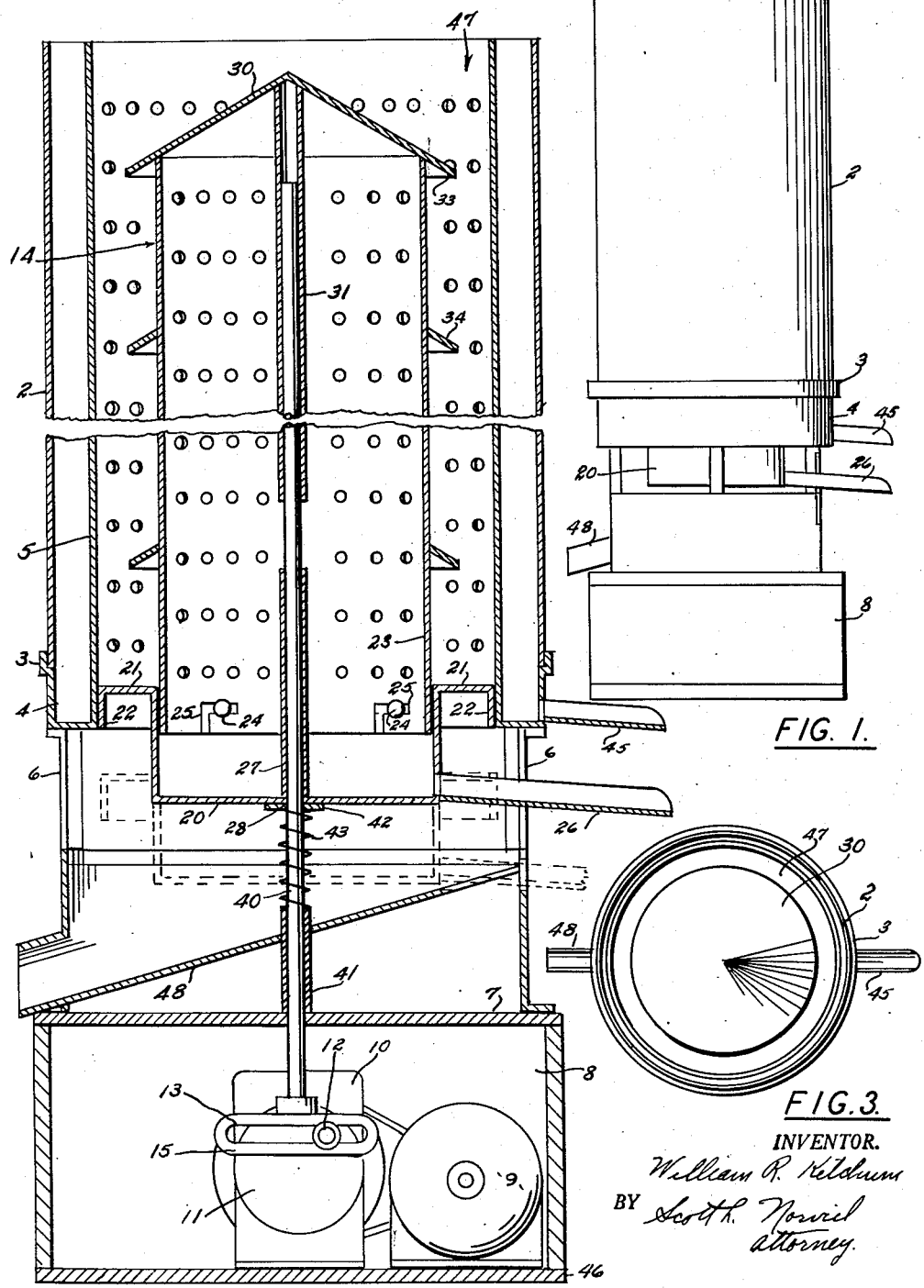

Oct. 23, 1951 W. R. KETCHUM 2,572,352
METHOD AND APPARATUS FOR EXTRACTING JUICE FROM CITRUS PULP
Filed Nov. 23, 1945

INVENTOR.
William R. Ketchum
BY Scott L. Norvell
Attorney.

Patented Oct. 23, 1951

2,572,352

UNITED STATES PATENT OFFICE 2,572,352

METHOD AND APPARATUS FOR EXTRACTING JUICE FROM CITRUS PULP

William R. Ketchum, Maricopa County, Ariz.

Application November 23, 1945, Serial No. 630,467

4 Claims. (Cl. 100—50)

This invention pertains to a method and apparatus for extracting citrus juice from pulp, burred or otherwise forced out of citrus fruit.

This apparatus and method is for use after the bulk of the juice has been removed by the ordinary methods of screening and draining freshly extracted juice.

Heretofore, the dry pulp rejects from screeners has been discarded or considered of little or no value so far as juice production is concerned. However, it is known that a usable quantity of potable juice is contained in the dry pulp rejects. Compressing the pulp causes unwanted solids and undesired bitter flavor to be comingled with any juice pressed out, and centrifuging is impractical as a continuous process. Therefore, in view of the foregoing, one of the objects of my invention is to provide a process for extracting potable juice from screened citrus pulp.

Another object is to provide an apparatus for extracting occluded juice from screened moist plup without breaking down the fibers of the pulp so as to add undesired solids, or dissolved substances.

A still further object is to provide a simply constructed apparatus, easily disassemblable for cleaning, which will continuously extract potable occluded juice from moist pulp screenings.

Other objects will appear hereinafter.

I attain the foregoing objects by means of the apparatus, devices, and methods illustrated in the accompanying drawings and hereinafter explained.

In the drawings, Figure 1 represents a side elevation of my device, and Figure 2, a vertical section thereof and Figure 3, a plan view thereof.

Similar numerals refer to similar parts in the several views.

In the drawings 2 indicates a cylindrical case made preferably of stainless steel. This rests in a rim 3 on an annular trough 4 which surrounds the bottom portion of a cylindrical sieve 5. Four legs 6 are attached to the bottom of this sieve and rest on a plate 7. Below this plate is a compartment 8 containing motor 9, speed reduction gears in a housing 10, and a crank wheel 11, having a crank bearing 12 operative in a slot 13 of connecting link 15.

Within sieve 5 a vertically reciprocating sieve and feed assembly 14 operates by motion transmitted thru link 15. This assembly consists of a base cup 20 having an annular rim 21 with a downwardly extending lip 22 sized to work with an easy sliding fit, pistonwise, within sieve 5. A perforated cylinder 23 fits within the upper part of this cup and is retained by engagement of studs 24 in inverted L slots 25 cut in its bottom edge, and by frictional retention of axial tube 31 on rod 40. A discharge pipe 26 is fitted into the bottom edge of cup 20 and extends radially therefrom. A guide tube 27 is fitted into the bottom of this cup around a hole 28 formed therein and extends upwardly a considerable distance above the top of the cup. The cylinder 23, being frictionally retained on rod 40 and latched to cup 20 may be simply removed by pulling off conical cover 30 and unlatching the cylinder from the cup, so that it and the interior parts may be cleaned.

The top of cylinder 23 is closed by a conically shaped cover 30. This has a guide tube 31 extending downwardly on the inside from its apex, which frictionally engages the upper portion of rod 40, as above stated. The rim of the cover projects over the upper edge of cylinder 23 forming a downwardly and outwardly extending annular lip 33. Downwardly and outwardly extending skirts 34 are fastened at intervals along the outside of cylinder 23. All these parts are preferably made of stainless steel, or the like.

The operating rod 40 extends from compartment 8 upward thru a guide bearing 41 and into tubes 27 and 31 of the assembly 14. The bottom of cut 20 rests on a disk 42 firmly attached to rod 40, and spring 43 operating between the bottom of this disk and the top of bearing 41 normally supports the greater part of the weight of assembly 14. The bottom of rod 40 is attached to link 15. The motor, speed reducing gear, crank wheel 11, and link 15 all constitute a means for reciprocating assembly 14 up and down at a speed of about 30 times per minute.

A juice discharge pipe 45 extends radially from annular trough 4. The entire device rests in a base 46 on the bottom compartment 8. A slanting pulp discharge trough 48 is positioned below cup 20, and is shaped to catch pulp spilling on the cup rim 21 when the cup is at its lowered position.

In use, moist pulp, that is, pulp from which juice has been screened by the usual methods, is introduced into the top of cylinder sieve 5 until the entire annular space 47, between this sieve and the perforated cylinder 23 is filled. This forms a cylindrical pile of pulp which lodges on the rim 21 of cup 20 which supports it so long as it is within the bottom of cylinder sieve 5. The pulp packs down by its own weight and this action tends to gently press out occluded juice retained by capillarity, or enclosed in uncrushed juice cell envelopes. This pressure is applied by gravity, or by the weight of the column of pulp itself. Juice released and collected in this manner seeps to the edges of this vertical annular pile and flows thru the perforations of both cylindrical sieves.

It flows downward on the respective opposite surfaces of these sieves and is caught in trough 4 and cup 20 and delivered thru pipes 45 and 26, respectively. In order to obtain this gravitational compressing the parts above described should be made so that the annular pulp column will be about three times the height of its mean diameter. The wall thickness of this column should not be more than one-sixth its diameter, and in any event should not exceed the distance thru which juice will travel by seepage. Thus if the mean diameter of the column is six inches, its wall thickness should be one inch and the maintained average column height eighteen inches. Therefore, it may be said that in any selected segment of the column, its height is approximately eighteen times its thickness.

After a pile has been formed and seepage started so that juice is being delivered to the supply tubes it is necessary to remove the compressed pulp from the bottom of the pile. This is done when assembly 14 is moved axially downward until the lip 22 of cup 20 clears the bottom of cylindrical sieve 5. When this is done the whole pulp pile moves axially pistonwise within the sieve. The weight of the upper portion of this pile forces the lower portion out over the lip 22 of cup 20 and it is caught in the pulp chute 48. As the assembly 14 again ascends this action stops and the pile is again enclosed between the walls of the perforated cylinders. Fresh pulp is added at the top of the device as fast as compressed pulp is discharged and the action is, in this way continuous.

The downward motion of the pulp is regulated and enhanced, and the compacting is increased by the downwardly and outwardly extending skirts 34 and the lip 33 of cover 30. During the upward part of the reciprocating motion, the skirts and lip tend to force the pulp engaged by them outward against sieve 5; and during the downward part of the motion, the pulp tends to be drawn inward toward the sieve cylinder 23. In either case, since the outer sieve 5 is perforated, it obviously offers some slight frictional resistance to pulp movement over its inner surface, and hence there will be a gentle shearing stress on the pulp column, on both the upward and downward stroke, which aids in extracting juice.

The column of pulp between inner sieve 23 and outer sieve 5 is kept in continuous jigging motion while it passes downward between the sieves. The particles comprising the column change but the column, as such, remains constant as long as fresh pulp is fed into the top of the device to replace pulp particles removed at the bottom. When assembly 14 moves upward this column is compressed and shortened due to the weight thereof. The particles in the upper part of the column crowd down on the particles in the lower portion, so that as assembly 14 moves upward particles in the lower portions of the column are forced upward against resistance of particles above, and are crowded outward against the inner walls of sieve 5, by contact with the downwardly and outwardly slanting upper faces of skirts 34. Conversely, as the assembly moves downward, these skirts, moving faster than the inner portion of the pulp column, tend to scoop particles inward toward the outer face of sieve 23.

From the above it will be understood that the pulp is introduced into an enclosed annular area to form an annular column or pile so that the weight of the pulp presses out small remnants of occluded juice. The pulp is vertically reciprocated, agitated or jounced to keep it from packing, and portions of pulp from which juice has been extracted are removed from the bottom of the pile as fresh pulp is introduced onto the top.

The process may be summarized by stating that pulp is formed into a vertical column or pile high enough so that the weight of the pulp pile presses juice out from the lower portion thereof; collecting the juice thus expressed; agitating the pile by vertical reciprocating motion; and removing pressed pulp from the bottom of said pile as fresh pulp is added at the top.

By this method I have succeeded in extracting three gallons of potable juice from each fifty gallons of screened pulp which would otherwise have been considered waste. The pressure applied by the weight of the pulp is never sufficient to release bitter elements from the rag particles and the apparatus shown makes it possible for the process to be carried on continuously.

Having now fully described my invention and explained its use I wish to be limited only by the following claims.

I claim:

1. Apparatus for extracting potable juice from screened citrus fruit juice pulp, including in combination, a vertically supported elongated, perforated, outer cylinder forming a sieve, an inner cylindrical, perforated, elongated metal sieve supported to reciprocate axially in said outer sieve, said inner sieve being closed at the top and having a flange near its bottom adapted to operate pistonwise in said outer sieve, means for collecting juice from the inside of said inner sieve, means for collecting juice from the outside of said outer sieve, mechanism for reciprocating said inner sieve within said outer sieve from a position where said flange extends into the bottom of said outer sieve to a position below the lower rim thereof, and a pulp chute positioned below the lower rim of said outer sieve adapted to remove pulp deposited therefrom, said perforated sieves having a series of vertically spaced apertures therein, and said inner sieve carrying a plurality of outwardly extending annular baffle members, the radial distance between said sieves being about $1/18$ of their length.

2. A gravity juice citrus pulp press, comprising in combination an outer, elongated, cylindrical sieve having an annular juice collecting trough around its lower portion provided with a spout; an inner cylindrical sieve mounted to operate axially therein and having a conically shaped cover with a downwardly and outwardly extending skirt, downwardly and outwardly extending annular baffle members attached along the length of said inner cylindrical sieve, a cup having a juice delivery spout removably attached to the bottom of said inner cylindrical sieve, said cup having an outwardly extending rim with a downwardly extending lip adapted to operate pistonwise in said outer sieve; motor driven mechanism adapted to vertically reciprocate said inner sieve and cup within said outer sieve so that at the lower portion of said motion, said cup rim clears and moves beyond the bottom edge of said outer cylindrical sieve, and means for receiving and carrying away pulp crowded over the rim of said cup lip during reciprocation, both of said cylindrical sieves having a series of vertically spaced apertures therein, and the radial distance between said sieves being about 1/18 of their length.

3. The method of extracting potable juice from screened citrus fruit pulp, consisting in forming the pulp into an inner elongated vertical column of a height about eighteen times its thickness, gently shearing the pulp longitudinally of the column, and slightly compacting it at the bottom of said column, collecting juice seeping from this mass by removal from the surface thereof, removing spent pulp from the bottom of said column, and adding fresh untreated pulp at the top thereof to maintain the height thereof.

4. The method of extracting potable juice from screened citrus fruit juice pulp consisting in forming said pulp into a cylindrical pile having a height about eighteen times that of the wall thickness thereof; gently and discontinuously shearing the pulp longitudinally of the pile, and compacting it slightly at the bottom of the pile; collecting and removing juice from the inner and outer surfaces of said pile; removing spent pulp from the bottom of said pile; and adding fresh pulp to the top thereof to maintain said height to thickness ratio.

WILLIAM R. KETCHUM.

REFERENCES CITED

The following references are of record in the file of this patent:

UNITED STATES PATENTS

| Number | Name | Date |
|---|---|---|
| 1,672,659 | Sohler | June 5, 1928 |
| 2,040,394 | Molin | May 12, 1936 |
| 2,367,677 | Haines | Jan. 23, 1945 |